(12) United States Patent
Marmur

(10) Patent No.: US 7,740,429 B2
(45) Date of Patent: Jun. 22, 2010

(54) DOUBLE LOCKING APPARATUS FOR USE WITH A ROLL-OFF CONTAINER TRANSPORT VEHICLE

(75) Inventor: Lazar Marmur, Plainsboro, NJ (US)

(73) Assignee: Omaha Standard, Inc., Council Bluffs, IA (US)

( * ) Notice: Subject to any disclaimer, the term of this patent is extended or adjusted under 35 U.S.C. 154(b) by 541 days.

(21) Appl. No.: 11/821,487

(22) Filed: Jun. 25, 2007

(65) Prior Publication Data

US 2008/0170925 A1 Jul. 17, 2008

Related U.S. Application Data

(60) Provisional application No. 60/879,983, filed on Jan. 11, 2007.

(51) Int. Cl.
*B60P 7/08* (2006.01)
(52) U.S. Cl. .......................... 410/80; 410/77
(58) Field of Classification Search ............... 410/77, 410/80, 78, 69, 76, 72, 73; 292/116, 214; 414/498; 248/500, 503
See application file for complete search history.

(56) References Cited

U.S. PATENT DOCUMENTS

| | | |
|---|---|---|
| 1,303,854 A | 5/1919 | Clark |
| 1,470,266 A | 10/1923 | Kirchner |
| 1,862,632 A | 6/1932 | Perin |
| 1,988,651 A | 1/1935 | Fildes |
| 2,351,314 A | 6/1944 | Ario |
| 3,158,106 A | 11/1964 | Clejan |
| 3,210,038 A | 10/1965 | Bader et al. |
| 3,282,550 A | 11/1966 | Warren |
| 4,121,789 A | 10/1978 | Lent et al. |
| 4,236,853 A | 12/1980 | Niggemeier |
| 4,349,302 A | 9/1982 | Ferguson, Jr. |
| 4,375,932 A | 3/1983 | Alberti |
| 4,557,648 A | 12/1985 | Koch et al. |
| 5,106,247 A | 4/1992 | Hove et al. |
| 5,112,173 A | 5/1992 | Eilenstein et al. |
| 5,362,184 A | 11/1994 | Hull et al. |
| 5,618,138 A | 4/1997 | Lockhart |
| 5,829,946 A | 11/1998 | McNeilus et al. |
| 5,957,640 A | 9/1999 | Schmieke et al. |
| 6,053,692 A | 4/2000 | Mason et al. |
| 6,315,508 B1 | 11/2001 | Nadon |
| 6,425,717 B1 | 7/2002 | Saggio et al. |
| 6,450,744 B1 | 9/2002 | Gilhuys et al. |
| 6,485,238 B2 | 11/2002 | Segura |
| 6,511,271 B1 | 1/2003 | Saroka |

(Continued)

*Primary Examiner*—Stephen Gordon
(74) *Attorney, Agent, or Firm*—Hodgson Russ LLP

(57) ABSTRACT

A redundant locking device is disclosed with two adjacently positioned latching arms each including an L-shaped hook portion selectively engageable with the container for securing it to a trailer or truck transport apparatus. The two latching arms are positively driven by a powering means such as a hydraulic or pneumatic cylinder which urges both latching arms toward the engaged position for securement of the container. Powering is provided through a lateral link member which is movably secured such as by a universally flexible ball and socket joint with respect to each latching arm for powering movement thereof responsive to activation of the driving air cylinder. The locking device can be secured to the side of a transport vehicle with the cylinder located between the retracted position of the arms or beneath the vehicle with the arms along the side of the vehicle and the drive cylinder positioned therebeneath.

22 Claims, 5 Drawing Sheets

U.S. PATENT DOCUMENTS

| | | |
|---|---|---|
| 6,514,021 B2 | 2/2003 | Delay |
| 6,524,042 B2 | 2/2003 | Chasen |
| 6,533,511 B1 | 3/2003 | deKoning |
| 6,565,299 B1 | 5/2003 | Guilbault et al. |
| 6,568,892 B2 | 5/2003 | Landoll et al. |
| 6,695,553 B1 | 2/2004 | Galbreath et al. |
| 6,698,607 B2 | 3/2004 | Brennan, Jr. |
| 6,729,818 B1 | 5/2004 | Yee et al. |
| 6,733,027 B2 | 5/2004 | Stragier et al. |
| 6,758,643 B1 | 7/2004 | Hsieh |
| 6,773,213 B1 | 8/2004 | Moradians |
| 6,840,724 B1 | 1/2005 | Trescott |
| 6,860,684 B2 | 3/2005 | Antonelli et al. |
| 6,896,456 B2 | 5/2005 | Huber |
| 6,896,457 B2 | 5/2005 | Halliar |
| 6,926,481 B2 | 8/2005 | Huber |
| 6,991,412 B2 | 1/2006 | Dorrian |
| 7,114,898 B2 | 10/2006 | Brewster |
| 7,172,378 B1 * | 2/2007 | Cerullo et al. ............ 410/80 |

* cited by examiner

DOUBLE LOCKING APPARATUS FOR USE WITH A ROLL-OFF CONTAINER TRANSPORT VEHICLE

This patent application claims priority of U.S. Provisional Patent Application No. 60/879,983 filed Jan. 11, 2007 in the United States Patent Office on "Double Locking Apparatus For Use With A Roll-Off Container Transport Vehicle" by inventor Lazar Marmur and assigned to Automated Waste Equipment Co., Inc., currently pending, and that application is hereby incorporated by reference.

BACKGROUND OF THE INVENTION

1. Field of the Invention

The present invention relates with the field of devices usable for providing a means for latching of containers onto rollback trailers and truck bodies. Such containers often are used for refuse or collection of other materials that need to be transported from one location to another. Such units are extremely heavy and need to be secured firmly with respect to a vehicle, that is, a trailer or a truck, prior to actual transporting movement of the vehicle.

Securing or locking of such devices is normally provided by securing of the container frame rail with respect to the frame of the transport vehicle. Previously securement was provided by various strapping devices however recently safety regulations have started to require roll-off transporters to utilize more comprehensive locking devices such as mechanical hooking arrangements.

A problem exists because such containers often include cross-members which interfere with the engaging of the hook portion of the locking member with respect to the container body rail itself. The present invention provides two separate latching arms which are spaced apart from one another by a moderate distance such that if one contacts the cross-member of the container and is prevented from moving to the locking position then the other one can be positively driven by the cylinder means to the locking position. Normally cross-members on containers are spaced apart a significant distance and are fairly narrow such that if one of the latching arms is prevented from movement to the locking position then the other latching arm will be capable of movement to the full locking position. Normally one such double locking apparatus will be included on each opposite side of a container transport frame.

The position of the individual cross-members of the containers are difficult to predict relative to the frame of the vehicle because the containers can be positioned at various locations and various containers have different configurations having cross-members of different spacings, sizes and/or positioning. For this reason the locking redundancy or use of dual latching arms in the present invention assures that firm locking is achieved by each locking mechanism with at least one of the latching arms thereof.

2. Description of the Prior Art

U.S. Pat. No. 6,695,553 has been granted on Feb. 24, 2004 on a "Device For Securing A Container To A Hoist" by inventors Galbreath et al. This patent describes a redundant securement device designed to solve the same problem that the present is deemed to be solve. However, that device utilizes a biasing means for operatively urging the hooks toward the activated locking position. On the other hand, the present invention is distinguishable since it utilizes a positive driven locking mechanism such as an air cylinder and does not make use of any biasing means for any purpose.

In particular, the present invention discloses a dual arm, dual hook, locking mechanism which is positively driven by a powering means such as a hydraulic cylinder. Other devices have been utilized for achieving locking of containers relative to vehicle or trailer bodies such as shown in U.S. Pat. No. 1,303,854 patented May 20, 1919 to E. W. Clark on a "Vehicle"; and U.S. Pat. No. 1,470,266 patented Oct. 9, 1923 to H. W. Kirchner on an "Interchangeable Unit Carrier"; and U.S. Pat. No. 1,862,632 patented Jun. 14, 1932 to D. W. Perin on a "Removable Container"; and U.S. Pat. No. 1,988,651 patented Jan. 22, 1935 to F. K. Fildes on an "Attachment For Container Carriers"; and U.S. Pat. No. 2,351,314 patented Jun. 13, 1944 to R. Ario on a "Locking Device For Roll-Off Van Bodies"; and U.S. Pat. No. 3,158,106 patented Nov. 24, 1964 to D. Clejan on "Freight Transportation Systems"; and U.S. Pat. No. 3,210,038 patented Oct. 5, 1965 to H. E. Bader et al on a "Cargo Latch"; and U.S. Pat. No. 3,282,550 patented Nov. 1, 1966 to R. A. Warren on a "Cargo Pallet Latch"; and U.S. Pat. No. 4,121,789 patented Oct. 24, 1978 to R. J. Lent et al on a "Cargo Latch"; and U.S. Pat. No. 4,236,853 patented Dec. 2, 1980 to J. F. Niggemeier et al and assigned to ACF Industries, Incorporated on a "Plated Container Pedestal Locking Member"; and U.S. Pat. No. 4,349,302 patented Sep. 14, 1982 to J. T. Ferguson, Jr. and assigned to Lockheed Corporation on a "Pallet Latching Mechanism"; and U.S. Pat. No. 4,375,932 patented Mar. 8, 1983 to J. Alberti and assigned to The Boeing Company on a "Powered Cargo Restraint"; and U.S. Pat. No. 4,557,648 patented Dec. 10, 1985 to E. Koch et al and assigned to Vereinigte Flugtechnische Werke GmbH on a "Latching Cargo In Aircraft"; and U.S. Pat. No. 5,106,247 patented Apr. 21, 1992 to J. Hove et al on an "Automatic Locking System"; and U.S. Pat. No. 5,112,173 patented May 12, 1992 to W. Eilensteiin et al and assigned to Deutsche Airbus GmbH on a "Locking Mechanism For Latching A Cargo Piece To A Loading Floor"; and U.S. Pat. No. 5,362,184 patented Nov. 8, 1994 to H. L. Hull et al on a "Lock Device For Garbage Truck Container"; and U.S. Pat. No. 5,618,138 patented Apr. 8, 1997 to D. S. Lockhart and assigned to Mathey/Leland International, Ltd. on a "Truck Pallet Locking Device"; and U.S. Pat. No. 5,829,946 patented Nov. 3, 1998 to G. B. McNeilus et al and assigned to McNeilus Truck And Manufacturing, Inc. on a "Detachable Truck Body And Handling Mechanism"; and U.S. Pat. No. 5,957,640 patented Sep. 28, 1999 to H. Schmieke et al and assigned to Daimler Chrysler Aerospace Airbus GmbH on an "X-Direction Locking Device For A Freight Securing System In A Freight Or Cargo Hold Of An Aircraft"; and U.S. Pat. No. 6,053,692 patented Apr. 25, 2000 to T. M. Mason et al on a "Device For Securing A Removable Container To A Hauling Vehicle"; and U.S. Pat. No. 6,315,508 patented Nov. 13, 2001 to G. Nadon on "Roll-On Roll-Off Container Hooks"; and U.S. Pat. No. 6,425,717 patented Jul. 30, 2002 to R. S. Saggio et al and assigned to The Boeing Company on a "Cargo Restraint Device"; and U.S. Pat. No. 6,450,744 patented Sep. 17, 2002 to D. R. Gilhuys et al and assigned to The Boeing Company on an "Overrideable Vertical Restraint For Cargo Handling Systems"; and U.S. Pat. No. 6,485,238 patented Nov. 26, 2002 to B. J. Segura and assigned to Pemco Aviation Group on a "Restraint Apparatus"; and U.S. Pat. No. 6,511,271 patented Jan. 28, 2003 to K. J. Saroka on a "Spring-Loaded Object Clamp"; and U.S. Pat. No. 6,514,021 patented Feb. 4, 2003 to D. A. Delay on a "T-Flange Engaging Load Bearing Bed"; and U.S. Pat. No. 6,524,042 patented Feb. 25, 2003 to R. J. Chasen on a "Compact Equipment Securing Apparatus"; and U.S. Pat. No. 6,533,511 patented to T. J. deKoning on Mar. 18, 2003 and assigned to Holland Company on a "Movable Container Lock For Shipping Containers"; and U.S. Pat. No. 6,565,299 patented May 20, 2003 to M. Guilbault et al and assigned to Moody Industries, Inc. on a "Cargo Retaining Apparatus"; and U.S. Pat. No. 6,568,892 patented May 27, 2003 to D. R. Landoll et al and assigned to Landoll Corporation on a "Container Lockdown Device"; and U.S. Pat. No. 6,695,553 patented Feb. 24, 2004 to D. E. Galbreath et al on a "Device For Securing A Container To A Hoist"; and U.S. Pat. No. 6,698,607 patented Mar. 2, 2004 to J. Brennan, Jr. on a "Shipping Platform Lockdown"; and U.S. Pat. No. 6,729,818 patented May 4, 2004 to P. L. Yee et al and assigned to The Boeing Company on a "Supplemental Cargo Restraint System For Oversized Cargo"; and U.S. Pat. No. 6,733,027 patented May 11, 2004 to M. G. Stragier et al and assigned to Delaware Capital Formation, Inc. on a "Detachable Truck Body/Semi Trailer"; and U.S. Pat. No. 6,758,643 patented Jul. 6, 2004 to D. Hsieh on a "Positioning Assembly For Positioning A Container On A Platform "; and U.S. Pat. No. 6,773,213 patented Aug. 10, 2004 to E. Moradians and assigned to Ancra International, LLC on a "Cargo Tie Down In A Vehicle"; and U.S. Pat. No. 6,840,724 patented Jan. 11, 2005 to W. B. Trescott on a "Spade Connector For Attaching An Intermodal Container To A Vehicle"; and U.S. Pat. No. 6,860,684 patented Mar. 1, 2005 to R. Antonelli et al and assigned to Raytheon Company on a "Loading System For Securing Cargo In The Bed Of A Vehicle"; and U.S. Pat. No. 6,896,456 patented May 24, 2005 to T. Huber and assigned to Telair International GmbH on a "Latch Unit"; and U.S. Pat. No. 6,896,457 patented May 24, 2005 to W. R. Halliar and assigned to TTX Company on a "Clamping System And Method For Securing Freight"; and U.S. Pat. No. 6,926,481 patented Aug. 9, 2005 to T. Huber and assigned to Telair International GmbH on a "Mounting Apparatus For A Transportation System"; and U.S. Pat. No. 6,991,412 patented Jan. 31, 2006 to M. Dorrian and assigned to Honda Canada, Inc. on a "Transport Device"; and U.S. Pat. No. 7,114,898 patented Oct. 3, 2006 to J. B. Brewster and assigned to Holland L. P. on a "Latch Device For Securing A Cargo Containers Together And/Or To Vehicle Decks".

SUMMARY OF THE INVENTION

The present invention includes a double locking apparatus for use with a roll-off vehicle which is particularly usable for transporting detachable containers and includes a housing securable with respect to the transport vehicle for retaining of containers thereon. A first locking arm is included pivotally movably mounted with respect to the housing which is pivotally movable between a first locking position and a first retracted position and vice versa for the purpose of facilitating detachable securement of a container with respect to the roll-off vehicle. Preferably the locking arm is L-shaped to facilitate engagement with respect to a container positioned on the vehicle. The first locking arm is movable through an angle of approximately ninety degrees during movement between the first locking position and the first retracted position thereof.

Similarly a second locking arm is included pivotally mounted with respect to the housing at a position spatially disposed from the first locking arm. This second locking arm is pivotally movable between a second locking position and a second retracted position and vice versa for facilitating detachable securement of a container with respect to the roll-off vehicle. The second locking arm is preferably L-shaped to facilitate engagement with respect to a container positioned on a roll-off vehicle. The second locking arm is preferably movable also through an angle of approximately ninety degrees during movement between the first locking position and the second locking position.

A movable drive link is included movable attached with respect to and extending between the first locking arm and the second locking arm for powering movement thereof. This movable drive link preferably will include a first arm engagement section movably engaged with respect to the first locking arm for facilitating the urging of movement thereof between the first locking position and the first retracted position and vice versa. Similarly the movable drive link will include a second arm engagement section. This second arm engagement section will preferably be spatially disposed at a position distant from the first arm engagement section and will be movably engaged with respect to the second locking arm for facilitating the urging of movement between the second locking position and the second retracted position.

A drive mechanism is included which is preferably pivotally mounted with respect to the housing and is longitudinally extensible and retractable with respect thereto. The drive preferably comprises an air cylinder. This air cylinder achieves both directions of movement of the first and second locking arms between the respective retracted positions and locking positions thereof.

In particular the movable attachment between the drive and the movable drive link and between the first arm engagement section and the first locking arm and between the second arm engagement section and the second locking arm will facilitate complete movement of the first locking arm to the first locking position despite any inability of the second locking arm to fully move to the second locking position such as in those situations where it may be blocked by contacting of the cross member. Similarly this connection will facilitate movement of the second locking arm to the second locking position despite any inability of the first locking arm to fully move to the first locking position because it may be in alignment with and be caused to abut a cross member that might be positioned thereadjacent. As such, the drive means and the flexible inner connections between the drive means and the first and second hooking arms provides the redundancy of mechanical latching to assure that despite the relative positioning of the container relative to the locking mechanism and despite the configuration of the cross members of the retainer full engagement thereof with respect to the roll-off vehicle will be achieved by operation of the drive mechanism of the present invention in such a manner as to urge movement of the first and second locking arms toward the locking positions thereof.

Further in this construction a pivot shaft may be included attached to the housing which extends therethrough with the first locking arm means attached thereto to facilitate pivotal movement with respect to the housing between the first locking position and the first retracted position. The second locking arm can also be attached to the pivot shaft at a position spatially disposed from the first locking arm to facilitate pivotal movement of the second locking arm with respect to the housing between the second locked position and the second retracted position thereof.

In the preferred configuration of the present invention the pivot shaft is fixedly mounted with respect to the housing and the first locking arm will define a first mounting hole extending therethrough which is adapted to receive the pivot shaft extending therethrough. In this manner the first locking arm will be pivotally movable mounted with respect to the pivot shaft to facilitate pivotal movement thereof between the first locked position and the first retracted position. Similarly the second locking arm will preferably define a second mounting hole extending therethrough adapted to receive the pivot shaft extending therethrough wherein the second locking arm is pivotally mounted with respect to the pivot shaft to facilitate pivotal movement thereof between the second locking position and the second retracted position.

In a preferred embodiment of the present invention the first locking arm is movable through an angle of approximately ninety degrees during movement between the first locking arm and the first retracted position and the second locking arm is also movable through a similar angle. This angle can vary widely and can be as low as seventy degrees and as large as one hundred and ten degrees. However, in any case, this pivotal movement is through approximately a ninety degree path of movement.

In a preferred configuration of the present invention the first locking arm will define a first driving bore therein which is adapted to receive the first arm engagement section of the movable drive link extending thereinto in order to facilitate powering of movement of the first locking arm between the first locking position and the first retracted position thereof. Furthermore the first arm engagement section will include a first ball section movably mounted within this driving bore. The first ball section and the first driving bore together will define a first flexible connecting mechanism or joint to facilitate flexibility in the engagement between the movable drive link and the first locking arm to allow full movement thereof from the first retracted position to the first locking position despite any blockage which might be experienced which would prevent full movement of said second locking arm from the second retracted position to the second locking position.

In a similar manner the second locking arm will define a second driving bore therein adapted to receive the second arm engagement section of the movable drive link extending thereinto to facilitate powering of movement of the second locking arm between the second locking position and the second retracted position thereof. Furthermore the second arm engagement section will include a second ball section movable mounted within the second diving bore. This second ball section and the second driving bore together will define a second flexible connecting mechanism or joint to facilitate flexibility and engagement between the movable drive link and the second locking arm to facilitate full movement thereof from the second retracted position to the second locking position despite any blockage that might be encountered preventing full movement of the first locking arm from the first retracted position to the first locking position such as resulting from the second locking arm being brought into contact with a container cross member.

Within the construction of the present invention the drive means will preferably comprise an air cylinder which includes an output shaft which is longitudinally extensible and retractable relative to the housing and may further include drive linkage extending between the output shaft and the movable drive link for maintaining movable attachment therebetween. The intermediate section of the movable drive link positioned between the first arm engagement section and the second arm engagement section will preferably be connected to the drive in a movable manner. The drive linkage will preferably include a U-link device attached to the output shaft of the drive which is movably connected with respect to the intermediate section of the movable drive link for the purpose of facilitating powering of driving movement thereof.

The drive linkage will preferably include a clevis pin extending through the U-link and also through the intermediate section of the movable drive link for maintaining flexible engagement therebetween.

Furthermore the intermediate section of the drive link preferably will include an upper slot and a lower slot positioned adjacent to one another which are adapted to receive the U-link mechanism extending therearound into each of the slots to further facilitate pivotally movable engagement between the output shaft of the air cylinder and the movable drive link.

The air cylinders preferred to be usable with the aspect of the present invention can be driven by air pressure in either direction. Normally such air cylinders include a fitting to which air can be attached on each opposite side of the piston located centrally therewithin to facilitate choice of powering movement of the air cylinder. As such, the air cylinder can be extensible to power movement of the locking arms to the locked position or can be retractable to power movement of the locking arms to the locked position. In other words, the drive means can be longitudinally extendable to urge movement of the first locking arm toward the first locking position and longitudinally retractable to urge movement of the first locking arm toward the first retracted position as well as being longitudinally extensible to urge movement of the second locking arm toward the second locking position and be longitudinally retractable to urge movement of the second locking arm toward the second retracted position.

On the other hand, with the opposite choice of movement the drive means will be longitudinally retractable to urge movement of the first locking arm toward the first locking position and be longitudinally extensible to urge movement of the first locking arm toward the first retracted position as well as being longitudinally retractable to urge movement of the second locking arm toward the second locking position and longitudinally extensible to urge movement of the second locking arm toward the second retracted position. The choice of orientation for movement is often opposite between the embodiment of the present invention adaptable for being positioned on the side of a roll-off vehicle when compared to a similar construction utilized for a similar purpose positioned beneath the roll-off vehicle frame. Also this choice can be reversed by reversing the point of connection between the movable drive link and the locking arms. By varying the point of connection therebetween on opposite sides of the pivot axis of the arms the direction of choice of movement of the drive mechanism can be reversed as desired.

Also, with the configuration of the apparatus of the present invention designed to be attached to the sides of a roll-off vehicle, normally the drive means is positioned laterally between the first retracted position of the first locking arm and the second retracted position of the second locking arm. On the other hand on devices designed to be secured beneath the roll-off transport vehicle, often the drive mechanism will be positioned below the frame and therefore not adjacent to the retracted positions of the locking arms and the locking arms will extend laterally outwardly from the frame and thus be positioned remotely from the drive means when in the retracted position thereof.

It is an object of the present invention to provide a double locking apparatus for use with a roll-off container transport vehicle which is usable with containers having various configurations, various sizes and particularly having cross-members spaced apart at varying dimensions.

It is an object of the present invention to provide a double locking apparatus for use with a roll-off container transport vehicle which assures locking of a container with respect to a transport surface regardless of the relative positioning of the container cross-members thereto.

It is an object of the present invention to provide a double locking apparatus for use with a roll-off container transport vehicle which is easily maintained.

It is an object of the present invention to provide a double locking apparatus for use with a roll-off container transport vehicle which includes a minimal number of moving members.

It is an object of the present invention to provide a double locking apparatus for use with a roll-off container transport vehicle which is driven to the locked position by a positively driven engaging drive means rather than being moved into the locking position by a biasing means.

It is an object of the present invention to provide a double locking apparatus for use with a roll-off container transport vehicle which is simple and efficient to maintain and is of minimal initial capital cost.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
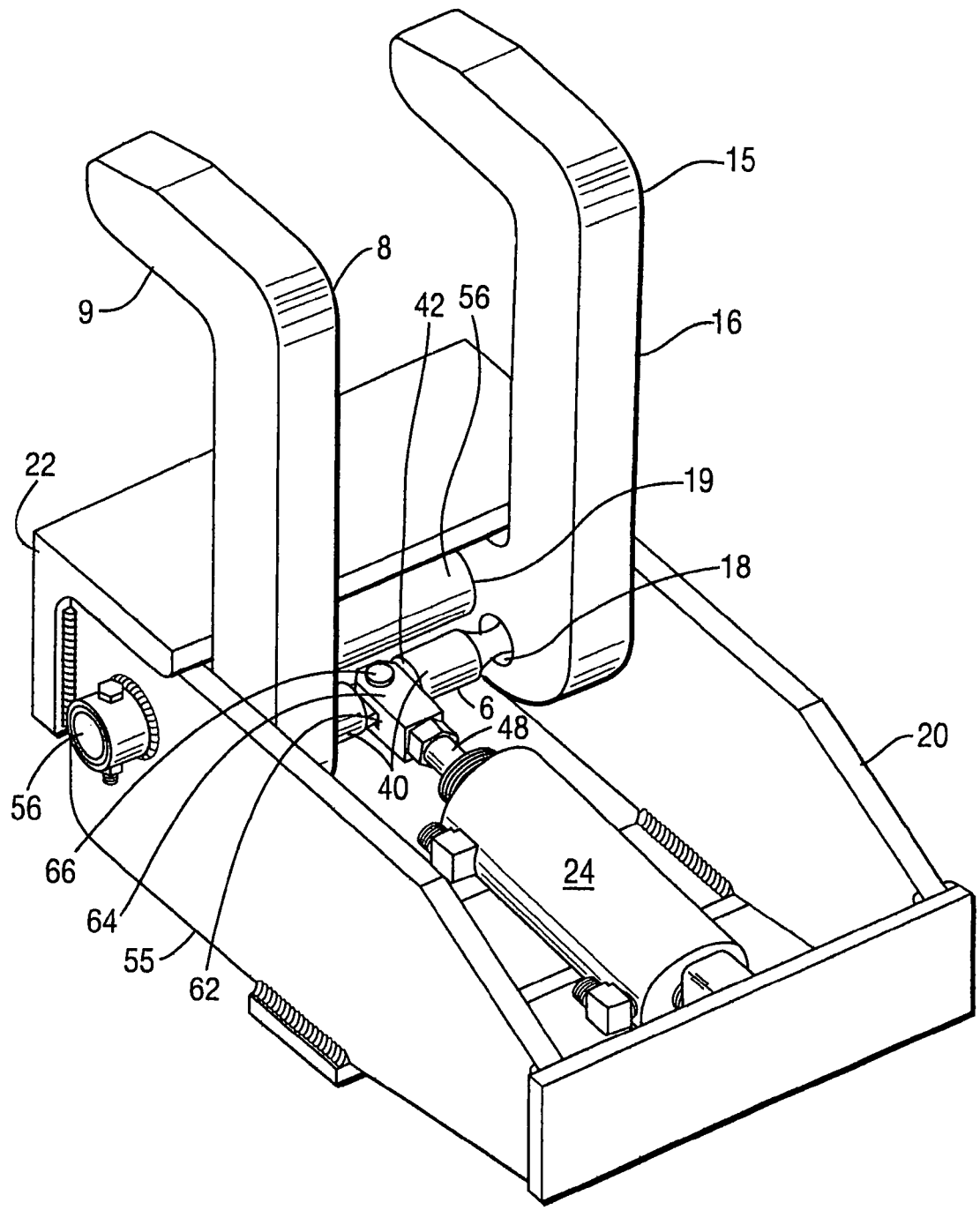
FIG. 1 is a perspective illustration of an embodiment of an apparatus for the present invention shown for use attachable to the side of a roll-off vehicle for locking detachable containers for transport thereon shown in the locking position.
Figure 2:
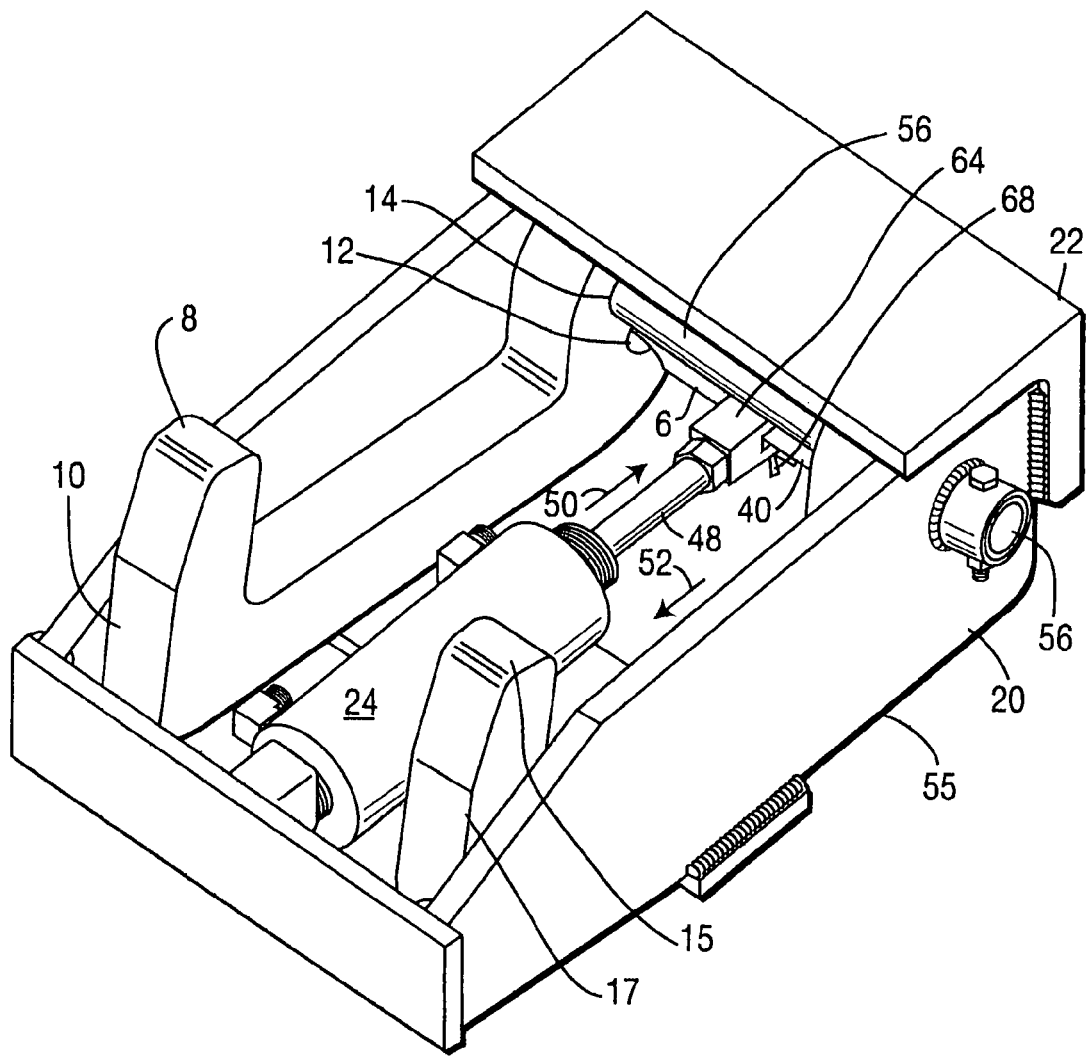
FIG. 2 is a three-quarter perspective illustration of the embodiment shown in FIG. 1 taken from the right wherein the locking arms are shown in the retracted position.

The present invention provides a locking mechanism for use with a roll-off vehicle 2 designed to carry one or more containers 4 positively secured thereto. The roll-off vehicles 2 can comprise trailers or trucks or any other conceivable vehicles which are normally used to carry these rather large containers 4 as desired for usage, often for trash hauling and the like.

It is necessary that the container 4 be secured directly to the roll-off vehicle 2 and, in particular, with respect to the vehicle frame 22 and for this purpose a first locking arm 8 and a second locking arm 15 are included. Each of these are pivotally secured with respect to the vehicle such that they can extend over the rail of a container 4 for holding it securely with respect to the roll-off vehicle especially during transport thereof. The present invention provides a self-contained unit for facilitating the locking and controlling movement of the locking arms 8 and 15 between the locked and unlocked positions thereof.

As such, the apparatus of the present invention includes a housing 20 with a pivot shaft 56 mounted therewithin. The first locking arm 8 is preferably pivotally mounted relative to the pivot shaft 56 and the second locking arm 15 is pivotally mounted with respect to the pivot shaft 56. Preferably the pivot shaft 56 will be fixedly secured with respect to the housing allowing the first locking arm 8 and the second locking arm 15 to be pivotally movable with respect thereto.

Figure 5:
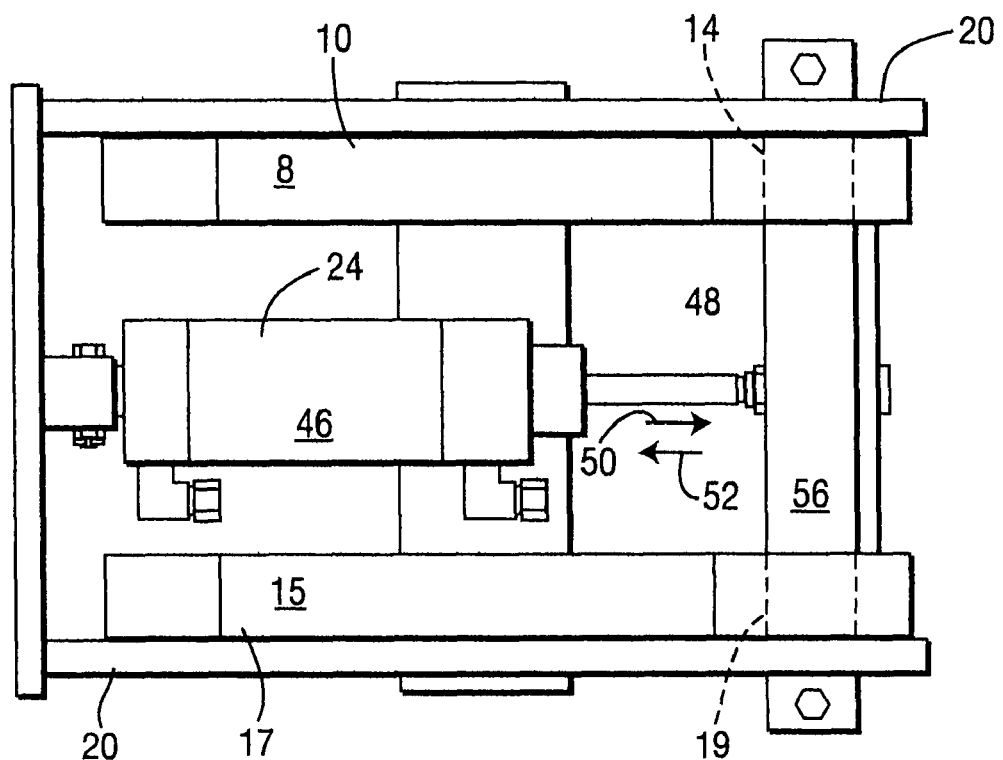
FIG. 5 is a top plan view of the embodiment of the apparatus shown in FIG. 1.
Figure 4:
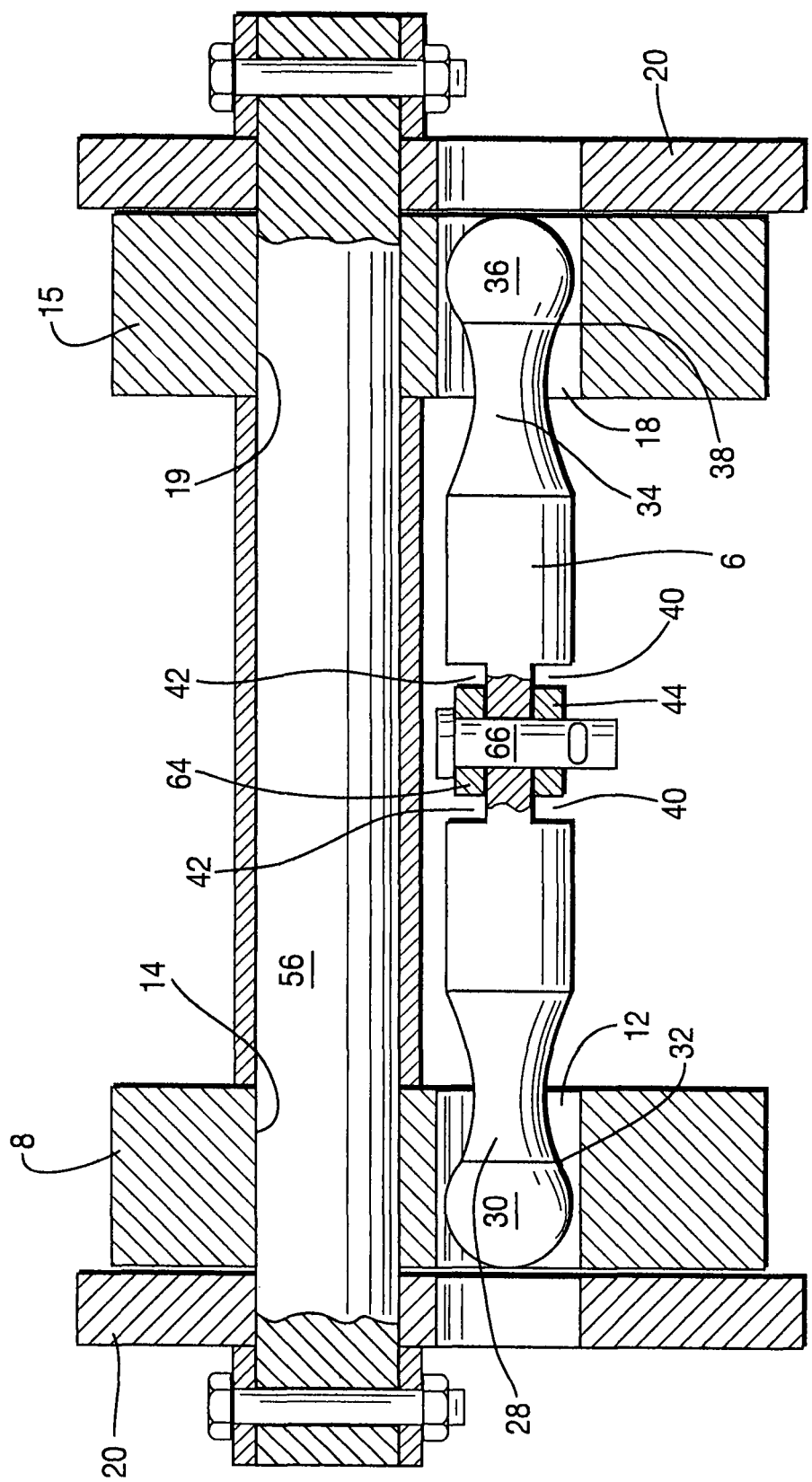
FIG. 4 is a cross-sectional view of an embodiment of the double locking apparatus of the present invention through FIG. 3 along lines 4-4.
Figure 6:
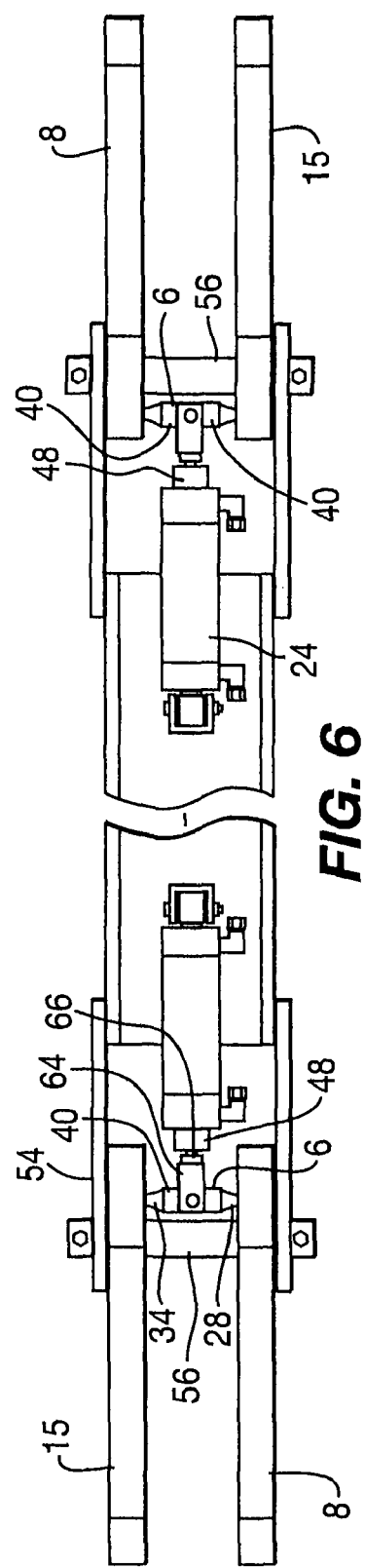
FIG. 6 is a top plan view of an alternative embodiment of the double locking apparatus of the present invention showing the configuration usable for securement beneath the frame of a roll-off vehicle with the locking arms shown in the retracted position.
Figure 7:
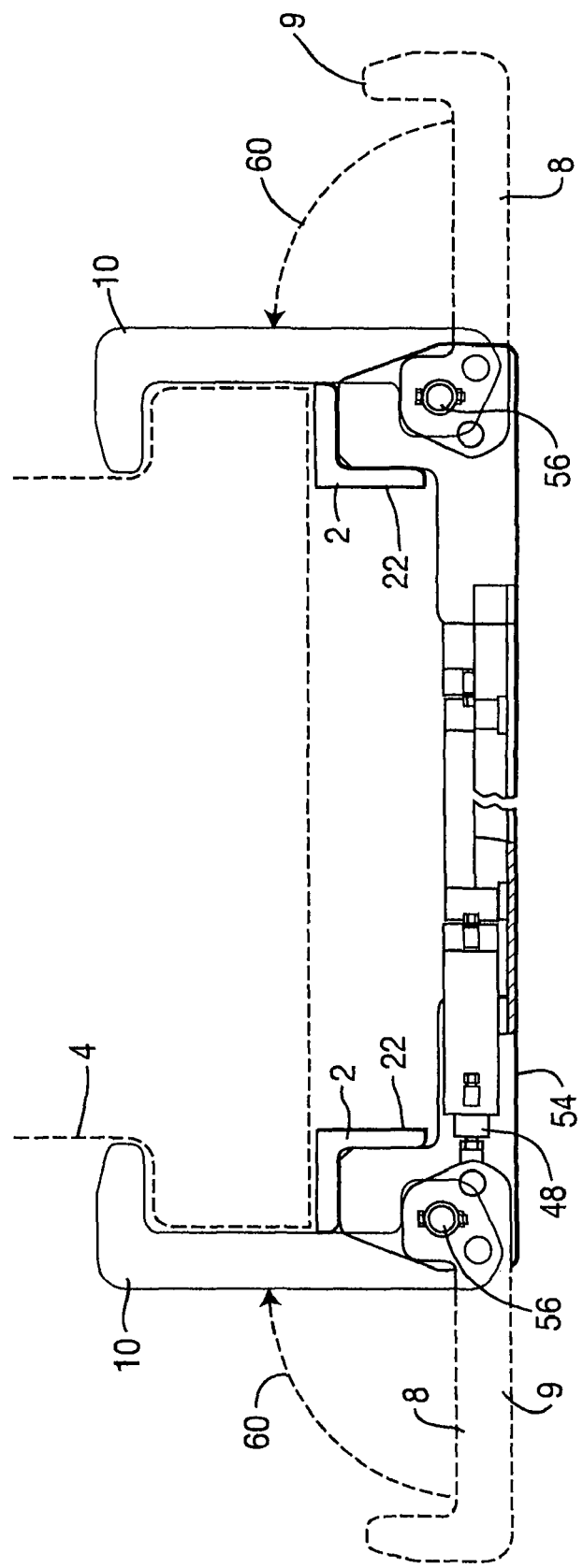
FIG. 7 is a side plan view of the embodiment shown in FIG. 1 showing the locking arms in full lining in the locking position and in broken line in the retracted position.

A drive means 24 such as an air cylinder is included mounted within the housing 20. Preferably the air cylinder 24 is movably mounted with respect to the housing 20. The housing 20 itself is preferably mounted with respect to the vehicle 2 by being mounted to the vehicle frame 22 at a position laterally with respect thereto or beneath the frame. Two separate configurations for addressing these two separate placements are disclosed in the drawings of the present invention. In particular the apparatus for a side mount is shown in FIGS. 1-5 and the construction for mounting beneath the frame are shown in FIGS. 6 and 7. Both constructions utilize the same concept for control of movement. In this preferred configuration the housing 20 is secured with respect to the vehicle frame 22 and the drive cylinder 24 is movably mounted relative to the housing 2. The drive cylinder 24 preferably includes an output shaft 48 which is longitudinally extensible and retractable by control of the application of air pressure to the air cylinder 24. Normally two separate fittings are provided one on each opposite side of the air cylinder 24 to allow the routing of air lines as desired for controlling movement thereof customized for particular application or configuration.

The first locking arm 8 is preferably pivotally movable between a first locking position 9 and a first retracted position 10. Movement between these two positions normally occurs by pivotal movement of the first locking arm 8 through an angle of approximately ninety degrees. When the first locking arm 8 is in the first locking position 9 it will engage the container 4 for securement thereof with respect to the roll-off vehicle 2. Similarly the second locking arm 15 is pivotally movable with respect to the pivot shaft 56 between the second locking position 16 in engagement with the container 4 for securing it relative to the roll-off vehicle 2 and a second retracted position 17. The first retracted position 10 of the first locking arm 8 and the second retracted position 17 of the second locking arm 15 are both normally positioned at a location within the housing 20 to facilitate storage thereof until the next time movement to the locking position is desired.

The first locking arm 8 and the second locking arm 15 provide a redundancy and capability for securement of a container 4 with respect to a roll-off vehicle 2. This redundancy is required since such conventional containers 4 normally include cross members. These cross members, if they might happen to be aligned with a locking arm, could prevent movement thereof to the fully locked position. As such, two separate locking arms, each movable to a locking arm position, are required. The spacing between these two locking arms 8 and 15 is critical since they must be chosen to be less than the normal spacing between cross members on containers. Containers can be of various configurations having cross members spaced at is various distances apart. The present invention provides a spacing between the two locking arms 8 and 15 less than normal narrow spacing between cross members on containers. Containers can be various configurations and the spacing and sizes of these cross members can vary significantly. By choosing the spacing between the locking arms 8 and 15 to be less than the most narrow spacing between cross members on any container provides a means for assuring that at least one of the locking mechanisms will be capable of being moved to the fully locked position. The present invention provides an apparatus which facilitates movement of either of the two locking arms 8 or 15 to the fully locked position despite the fact that the other arm may be blocked from the total movement by encountering or being brought into abutment with respect to a cross member or other structural impediment.

In order to assure this flexibility in design, it is necessary that the drive linkage between the arms 8 and 15 and the output shaft 48 of the drive cylinder 24 be flexible to a sufficient extent to assure locking occurs despite the resulting orientation between the cross members of the container and the locking mechanism. It is also important that this engagement of the locking means be powered by a positive locking engagement means rather than any generic biasing means. Such generic biasing means are inherently less reliable than positive engaging movement achievable by the drive linkage 62 of the present invention.

The present invention specifically includes a movable drive link 6 which is movably secured to the first locking arm 18 and is movably secured with respect to the second locking arm 15. The movable drive link 6 is also movably engaged with respect to the output shaft 48 of the drive cylinder 24. In particular the movable drive link 6 will include a first arm engagement section 28 and a second arm engagement section 34. Preferably these will be spaced apart and separated by an intermediate section 40. The first arm engagement 28 will include a first ball section 30. The first locking arm 8 will define a first driving bore 12 therewithin. The first ball section 30 will be positionable extending into the first driving bore 12 to provide a first flexible connecting means 32 between the movable drive link 6 and the first locking arm 8.

In a similar manner a second driving bore 18 will be defined in the second locking arm 15. The second arm engagement section 34 will include a second ball section 36. Second ball section 36 is defined to be extendable into the second driving bore 18 to facilitate movable connection thereinto and define a second flexible connecting means 38. Each of the flexible connections 32 and 38 will provide a universal capability of pivotal movement between the movable drive link 6 and the first and second locking arms 8 and 15. This flexibility in driving and powering of movement pivotally of the locking arms between the locking positions and the retracted positions thereof facilitates engagement of at least one of the two locking arms 8 or 15 relative to the container 4 for securing it to the vehicle 2 even though one of the two locking arms may come into abutment with respect to a cross member or other device which may prevent complete movement thereof to the locking position. In this situation the other locking arm will be capable of full movement.

Further flexibility in this connection is provided by the configuration of the intermediate section 40 of the movable drive link 6 and the configuration of the remaining portion of the drive linkage 62. Preferably the intermediate section 40 will include an upper slot means 42 and a lower slot means 44 positioned immediately adjacent to one another. Also preferably the drive linkage 62 will include a U-link member 64 secured fixedly at one end to the output shaft 48 of the air cylinder drive means 24 with the U-shaped portion thereof extending around the intermediate section 40 at the upper and lower slot means 42 and 44 such that the U-link 64 actually extends into these two slots. A clevis pin 66 will then preferably extend through the U-link member 64 and through the intermediate section 40 at the upper and lower slot means 42 and 44 to facilitate pivotal interconnection between the output shaft 48 and the movable drive link 6.

Rotating movement of the first locking arm 8 between the first retracted position 10 and the first locking position 9 will be achieved preferably by the defining of a first mounting hole 14 extending completely through the first locking arm 8. In this manner the first locking arm 8 can then be mounted with the pivot shaft 56 extending through the first mounting hole 14 thereof to facilitate pivotal movement of the first locking arm between the first locking position 9 and the first retracted position 10.

In a similar manner a second mounting hole 19 can be defined extending completely through the second locking arm 15 to facilitate pivotal movement thereof. With this configuration the pivot shaft 56 will be adapted to extend through the second mounting hole 19 for facilitating control and accuracy of pivotal movement of the second locking arm 15 between the second locking position 16 and the second retracted position 17 thereof and vice versa.

As shown best in FIG. 7 each of the locking arms 8 and 15 will be preferably moved through an angle 60 of approximately ninety degrees. Also as shown best in FIG. 2 the clevis pin 66 can include a cotter pin 68 extending through the lower portion thereof to prevent the clevis pin 66 from accidentally being removed from its position extending through the U-link member 64 and through the upper and lower slot means 42 and 44 and the intermediate section 40 of the movable drive link 6.

Figure 3:
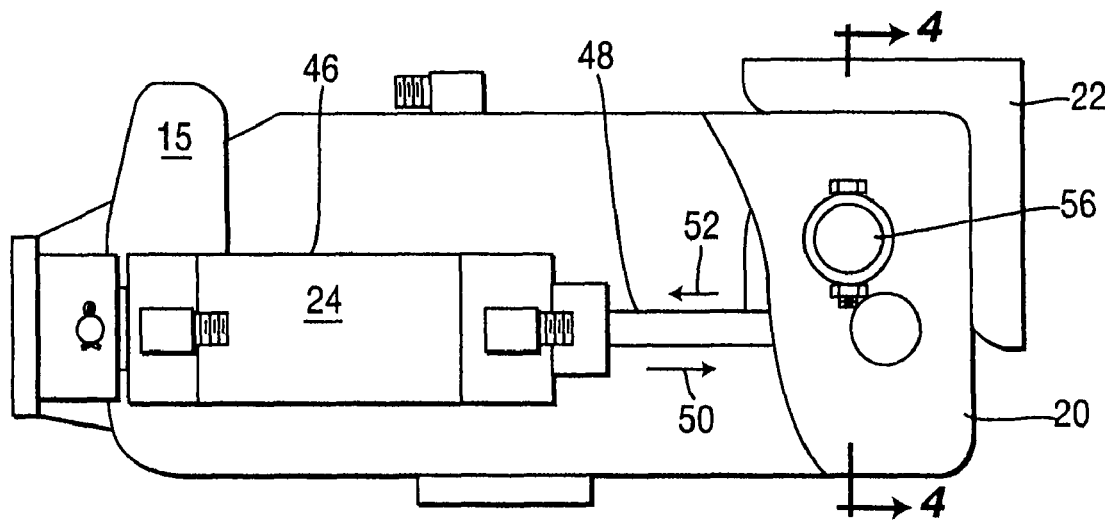
FIG. 3 is a side plan breakaway view of an embodiment of the double locking apparatus of the present invention.

With the configuration shown in FIG. 3 the output shaft 48 of the air cylinder drive means 24 will be movable in an extensible direction 50 to cause movement of the first locking arm 8 and the second locking arm 15 toward the first locking position 9 and the second locking position 16, respectively. This construction is also shown in FIG. 5. With this construction the movement of the output shaft 48 in the retractable direction 54 will cause the first locking arm 8 and the second locking arm 15 to return to the first retracted position 10 and the second retracted position 17 thereof, respectively. It should be appreciated that the orientation for the longitudinal extension and retracting can be arbitrarily chosen and it is easily reversible. Powering movement of the driving air cylinder 24 can be routed by the chosen circuitry of the air pressure supply lines. Normally such an air cylinder includes two separate fittings, one on each opposite side of the internally located piston of the air cylinder, such that movement of that piston can be controlled with a chosen control logic which achieves proper operation of the movement of the locking arms 8 and 15 between the locking and retracted positions thereof as necessary. In particular, the side frame mounting apparatus 55 is shown in FIGS. 1-5. This design is adapted to be attached to the outside lateral surface of the frame 22 of a roll-off vehicle 2 for controlling movement. With this configuration normally the cylinder will be positioned between the first locking arm 8 and the second locking arm 15 when they are located in the respective first retracted position 10 and second retracted position 17.

Alternatively, an apparatus designed for mounting under the frame is shown by reference numeral 54 in FIGS. 6 and 7 wherein the locking arms 8 and 15 do indeed still pivot in a similar manner to the positioning of the side frame unit 55 but wherein the driving air cylinder 24 is positioned beneath the vehicle frame 22. As such, it can be seen that in the operation of the present invention the redundancy in engagement of the locking mechanism assuring the container 4 is positively engaged with respect to the roll-off vehicle 2 is achieved. This is achieved by the redundancy in the inclusion of two separate locking arms 8 and 15 in the apparatus of the present invention each of which is capable of fully engaging the container 4 with respect to the roll-off vehicle 2 despite the existence of some type of blockage which may prevent one of the two locking arms from moving to the fully engaged locking positions 9 and 16. It is the flexibility in the drive linkage 62 as well as the flexibility in the first flexible connecting means 32 is and the second flexible connecting means 38 that provides this capability. It is also important to note that this engagement is a positively driven mechanism and does not utilize any type of a biasing means for urging the hooks toward the activated locking position. All movement of the hooks toward the activated locking position is achieved by a power driven mechanism, namely, the drive means 24 and more particularly the extending or retracting movement of the output shaft 48 of the drive cylinder 24.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

I claim:

1. A double locking apparatus for use with a roll-off vehicle usable for transporting detachable containers comprising:
   A. a housing means securable with respect to a transport vehicle for facilitating retaining of containers with respect thereto:
   B. a first locking arm means pivotally movably mounted with respect to said housing means and being pivotally movable between a first locking position and a first retracted position for facilitating detachable securement of a container with respect to a roll-off vehicle;
   C. a second locking arm means pivotally movably mounted with respect to said housing means at a position spatially disposed from said first locking arm means, said second locking arm means being pivotally movable between a second locking position and a second retracted position for further facilitating detachable securement of a container with respect to a roll-off vehicle;
   D. a movable drive link means movably attached with respect to and extending between said first locking arm means and said second locking arm means for powering movement thereof, said movable drive link means including:
      (1) a first arm engagement section being movably engaged with respect to said first locking arm means for facilitating urging movement thereof between said first locking position and said first retracted position;
      (2) a second arm engagement section spatially disposed from said first arm engagement section and being movably engaged with respect to said second locking arm means for facilitating urging movement thereof between said second locking position and said second retracted position; and
   E. a drive means attached with respect to a roll-off vehicle and being longitudinally extensible and retractable, said drive means also being movably attached with respect to said movable drive link means for powering movement thereof and for urging movement of said first locking arm means from said first locking position toward said first retracted position and from said first retracted position toward said first locking position, and for urging movement of said second locking arm means from said second locking position toward said second retracted position and from said second retracted position toward said second locking position, the movable attachment between said drive means and said movable drive link means and between said first arm engagement section and said first locking arm means and between said second arm engagement section and said second locking arm means facilitating movement of said first locking arm means to said first locking position despite any inability of said second locking arm means to fully move to said second locking position and facilitating movement of said second locking arm means to said second locking position despite any inability of said first locking arm means to fully move to said first locking position.

2. A double locking apparatus for use with a roll-off vehicle usable for transporting detachable containers as defined in claim 1 wherein said drive means is attached with respect to said housing means and said housing means is mounted to a roll-off vehicle.

3. A double locking apparatus for use with a roll-off vehicle usable for transporting detachable containers as defined in claim 1 wherein said movable drive link means includes an intermediate section positioned between said first arm engagement section and said second arm engagement section and wherein said drive means is movably attached with respect to said intermediate section to facilitate powering movement of said movable drive link means.

4. A double locking apparatus for use with a roll-off vehicle usable for transporting detachable containers as defined in claim 1 wherein said drive means comprises an air cylinder.

5. A double locking apparatus for use with a roll-off vehicle usable for transporting detachable containers as defined in claim 1 wherein said drive means is longitudinally extensible to urge movement of said first locking arm means toward the first locking position and is longitudinally retractable to urge movement of said first locking arm means toward the first retracted position, and wherein said drive means is longitudinally extensible to urge movement of said second locking arm means toward the second locking position and is longitudinally retractable to urge movement of said second locking arm means toward the second retracted position.

6. A double locking apparatus for use with a roll-off vehicle usable for transporting detachable containers as defined in claim 1 wherein said drive means is longitudinally retractable to urge movement of said first locking arm means toward the first locking position and is longitudinally extensible to urge movement of said first locking arm means toward the first retracted position and wherein said drive means is longitudinally retractable to urge movement of said second locking arm means toward the second locking position and is longitudinally extensible to urge movement of said second locking arm means toward the second retracted position.

7. A double locking apparatus for use with a roll-off vehicle usable for transporting detachable containers as defined in claim 1 wherein said first locking arm means and said second locking arm means are L-shaped to facilitate engagement with respect to a container positioned on a roll-off vehicle.

8. A double locking apparatus for use with a roll-off vehicle usable for transporting detachable containers as defined in claim 1 further comprising a pivot shaft attached to said housing means and extending therethrough and wherein said first locking arm means is attached to said pivot shaft to facilitate pivotal movement with respect to said housing means between the first locking position and the first retracted position thereof and wherein said second locking arm means is attached to said pivot shaft at a position spatially disposed from said first locking arm means to facilitate pivotal movement of said second locking arm means with respect to said housing means between the second locking position and the second retracted position thereof.

9. A double locking apparatus for use with a roll-off vehicle usable for transporting detachable containers as defined in claim 8 wherein said pivot shaft is fixedly mounted with respect to said housing means and wherein said first locking arm means defines a first mounting hole means extending therethrough adapted to receive said pivot shaft extending therethrough and wherein said first locking arm means is pivotally movably mounted with respect to said pivot shaft to facilitate pivotal movement thereof between the first locking position and the first retracted position, and wherein said second locking arm means defines a second mounting hole means extending therethrough adapted to receive said pivot shaft extending therethrough and wherein said second locking arm means is pivotally movably mounted with respect to said pivot shaft to facilitate pivotal movement thereof between the second locking position and the second retracted position.

10. A double locking apparatus for use with a roll-off vehicle usable for transporting detachable containers as defined in claim 1 wherein said first locking arm means is movable through an angle of approximately ninety degrees during movement between the first locking position and the first retracted position thereof, and wherein said second locking arm means is movable through an angle of approximately ninety degrees during movement between the second locking position and the second retracted position thereof.

11. A double locking apparatus for use with a roll-off vehicle usable for transporting detachable containers as defined in claim 1 wherein said first locking arm means defines a first driving bore means therein which is adapted to receive said first arm engagement section of said movable drive link means extending therewithin to facilitate powering of movement of said first locking arm means between the first locking position and the first retracted position thereof.

12. A double locking apparatus for use with a roll-off vehicle usable for transporting detachable containers as defined in claim 11 wherein said first arm engagement section includes a first ball section movably mounted within said first driving bore means, said first ball section and said first driving bore means together defining a first flexible connecting means to facilitate flexibility in engagement between said movable drive link means and said first locking arm means to allow full movement thereof from the first retracted position to the first locking position despite any blockage preventing full movement of said second locking arm means from said second retracted position to said second locking position.

13. A double locking apparatus for use with a roll-off vehicle usable for transporting detachable containers as defined in claim 1 wherein said second locking arm means defines a second driving bore means therein which is adapted to receive said second arm engagement section of said movable drive link means extending therewithin to facilitate powering of movement of said second locking arm means between the second locking position and the second retracted position thereof.

14. A double locking apparatus for use with a roll-off vehicle usable for transporting detachable containers as defined in claim 13 wherein said second arm engagement section includes a second ball section movably mounted within said second driving bore means, said second ball section and said second driving bore means together defining a second flexible connecting means to facilitate flexibility in engagement between said movable drive link means and said second locking arm means to allow full movement thereof from the second retracted position to the second locking position despite any blockage preventing full movement of said first locking arm means from said first retracted position to said first locking position.

15. A double locking apparatus for use with a roll-off vehicle usable for transporting detachable containers as defined in claim 1 wherein said drive means comprises an air cylinder means and includes an output shaft which is longitudinally extensible and retractable with respect to said housing means and further comprising drive linkage means extending between said output shaft and said movable drive link means for maintaining attachment therebetween.

16. A double locking apparatus for use with a roll-off vehicle usable for transporting detachable containers as defined in claim 15 wherein said movable drive link means includes an intermediate section positioned between said first arm engagement section and said second arm engagement section and wherein said drive means is movably attached with respect to said intermediate section to facilitate powering movement of said movable drive link means, said drive linkage means including a U-link means attached to said output shaft of said drive means and movably connected with respect to said intermediate section of said movable drive link means to facilitate powering of driving movement thereof.

17. A double locking apparatus for use with a roll-off vehicle usable for transporting detachable containers as defined in claim 16 wherein said drive linkage means further includes a clevis pin means extending through said U-link means and also through said intermediate section of said movable drive link means for maintaining pivotally flexible engagement therebetween.

18. A double locking apparatus for use with a roll-off vehicle usable for transporting detachable containers as defined in claim 17 wherein said intermediate section defines an upper slot means and a lower slot means positioned thereon adjacently, said upper slot means and said lower slot means adapted to receive said U-link means positioned extending therewithin to further facilitate pivotally movement engagement between said output shaft of said cylinder means and said movable drive link means.

19. A double locking apparatus for use with a roll-off vehicle usable for transporting detachable containers as defined in claim 1 wherein said drive means is pivotally mounted with respect to said housing means.

20. A double locking apparatus for use with a roll-off vehicle usable for transporting detachable containers as defined in claim 1 wherein said drive means is positioned laterally between said first retracted position of said first locking arm means and said second retracted position of said second locking arm means.

21. A double locking apparatus for use with a roll-off vehicle usable for transporting detachable containers comprising:
   A. a housing means securable with respect to a transport vehicle for facilitating retaining of containers with respect thereto:
   B. a first locking arm means pivotally movably mounted with respect to said housing means and being pivotally movable between a first locking position and a first retracted position for facilitating detachable securement of a container with respect to a roll-off vehicle, said first locking arm means being L-shaped to facilitate engagement with respect to a container positioned on a roll-off vehicle, said first locking arm means being movable through an angle of approximately ninety degrees during movement between the first locking position and the first retracted position thereof;

C. a second locking arm means pivotally movably mounted with respect to said housing means at a position spatially disposed from said first locking arm means, said second locking arm means being pivotally movable between a second locking position and a second retracted position for further facilitating detachable securement of a container with respect to a roll-off vehicle, said second locking arm means being L-shaped to facilitate engagement with respect to a container positioned on a roll-off vehicle, said second locking arm means being movable through an angle of approximately ninety degrees during movement between the second locking position and the second retracted position thereof;

D. a movable drive link means movably attached with respect to and extending between said first locking arm means and said second locking arm means for powering movement thereof, said movable drive link means including:
  (1) a first arm engagement section being movably engaged with respect to said first locking arm means for facilitating urging movement thereof between said first locking position and said first retracted position;
  (2) a second arm engagement section spatially disposed from said first arm engagement section and being movably engaged with respect to said second locking arm means for facilitating urging movement thereof between said second locking position and said second retracted position;

E. a drive means pivotally movably attached with respect to said housing means and being longitudinally extensible and retractable with respect thereto, said drive means comprising an air cylinder, said drive means also being movably attached with respect to said movable drive link means for powering movement thereof and for urging movement of said first locking arm means from said first locking position toward said first retracted position and from said first retracted position toward said first locking position, and for urging movement of said second locking arm means from said second locking position toward said second retracted position and from said second retracted position toward said second locking position, the movable attachment between said drive means and said movable drive link means and between said first arm engagement section and said first locking arm means and between said second arm engagement section and said second locking arm means facilitating movement of said first locking arm means to said first locking position despite any inability of said second locking arm means to fully move to said second locking position and facilitating movement of said second locking arm means to said second locking position despite any inability of said first locking arm means to fully move to said first locking position; and F. a pivot shaft attached to said housing means and extending therethrough with said first locking arm means attached thereto to facilitate pivotal movement with respect to said housing means between the first locking position and the first retracted position thereof, said second locking arm means being attached to said pivot shaft at a position spatially disposed from said first locking arm means to facilitate pivotal movement of said second locking arm means with respect to said housing means between the second locking position and the second retracted position thereof.

22. A double locking apparatus for use with a roll-off vehicle usable for transporting detachable containers comprising:

A. a housing means securable with respect to a transport vehicle for facilitating retaining of containers with respect thereto:

B. a first locking arm means pivotally movably mounted with respect to said housing means and being pivotally movable between a first locking position and a first retracted position for facilitating detachable securement of a container with respect to a roll-off vehicle, said first locking arm means being L-shaped to facilitate engagement with respect to a container positioned on a roll-off vehicle, said first locking arm means defining a first driving bore means therein;

C. a second locking arm means pivotally movably mounted with respect to said housing means at a position spatially disposed from said first locking arm means, said second locking arm means being pivotally movable between a second locking position and a second retracted position for further facilitating detachable securement of a container with respect to a roll-off vehicle, said second locking arm means being L-shaped to facilitate engagement with respect to a container positioned on a roll-off vehicle, said second locking arm means defining a second driving bore means therein;

D. a movable drive link means movably attached with respect to and extending between said first locking arm means and said second locking arm means for powering movement thereof, said movable drive link means including:
  (1) a first arm engagement section being movably engaged with respect to said first locking arm means for facilitating urging movement thereof between said first locking position and said first retracted position, said first driving bore means being adapted to receive said first arm engagement section of said movable drive link means extending therewithin to facilitate powering of movement of said first locking arm means between the first locking position and the first retracted position thereof, said first arm engagement section including a first ball section movably mounted within said first driving bore means, said first ball section and said first driving bore means together defining a first flexible connecting means to facilitate flexibility in engagement between said movable drive link means and said first locking arm means to allow full movement thereof from the first retracted position to the first locking position despite any blockage preventing full movement of said second locking arm means from said second retracted position to said second locking position;
  (2) a second arm engagement section spatially disposed from said first arm engagement section and being movably engaged with respect to said second locking arm means for facilitating urging movement thereof between said second locking position and said second retracted position, said second driving bore means being adapted to receive said second arm engagement section of said movable drive link means extending therewithin to facilitate powering of movement of said second locking arm means between the second locking position and the second retracted position thereof, said second arm engagement section including a second ball section movably mounted within said second driving bore means, said second ball section and said second driving bore means together defining a second flexible connecting means to facilitate flexibility in engagement between said movable drive link means and said second locking arm means to allow full movement thereof from the second retracted position to the second locking position despite any blockage preventing full movement of said first arm locking means from said first retracted position to said first locking position;

(3) an intermediate section positioned between said first arm engagement section and said second arm engagement section, said intermediate section defining an upper slot means and a lower slot means positioned thereon adjacently;

E. a drive means pivotally movably attached with respect to said housing means and being longitudinally extensible and retractable with respect thereto, said drive means comprising an air cylinder including an output shaft which is longitudinally extensible and retractable with respect to said housing means, said drive means also being movably attached with respect to said movable drive link means for powering movement thereof and for urging movement of said first locking arm means from said first locking position toward said first retracted position and from said first retracted position toward said first locking position, and for urging movement of said second locking arm means from said second locking position toward said second retracted position and from said second retracted position toward said second locking position, the movable attachment between said drive means and said movable drive link means and between said first arm engagement section and said first locking arm means and between said second arm engagement section and said second locking arm means facilitating movement of said first locking arm means to said first locking position despite any inability of said second locking arm means to fully move to said second locking position and facilitating movement of said second locking arm means to said second locking position despite any inability of said first locking arm means to fully move to said first locking position;

F. a pivot shaft attached to said housing means and extending therethrough with said first locking arm means attached thereto to facilitate pivotal movement with respect to said housing means between the first locking position and the first retracted position thereof, said second locking arm means being attached to said pivot shaft at a position spatially disposed from said first locking arm means to facilitate pivotal movement of said second locking arm means with respect to said housing means between the second locking position and the second retracted position thereof, said pivot shaft being fixedly mounted with respect to said housing means and said first locking arm means defining a first mounting hole means extending therethrough adapted to receive said pivot shaft extending therethrough, said first locking arm means being pivotally movably mounted with respect to said pivot shaft to facilitate pivotal movement thereof between the first locking position and the first retracted position, said second locking arm means defining a second mounting hole means extending therethrough adapted to receive said pivot shaft extending therethrough, said second locking arm means being pivotally movably mounted with respect to said pivot shaft to facilitate pivotal movement thereof between the second locking position and the second retracted position;

G. drive linkage means extending between said output shaft and said movable drive link means for maintaining attachment therebetween, said drive linkage means including;

(1) a U-link means attached to said output shaft of said drive means and movably connected with respect to said intermediate section of said movable drive link means to facilitate powering of driving movement thereof, said upper slot means and said lower slot means of said intermediate section of said movable drive link means being adapted to receive said U-link means positioned therewithin to further facilitate pivotally movement engagement between said output shaft of said cylinder means and said movable drive link means; and (2) a clevis pin means extending through said U-link means and also through said intermediate section and said upper slot means and said lower slot means thereof for maintaining pivotally flexible engagement between said movable drive link means and said output shaft of said drive means.

\* \* \* \* \*